(12) United States Patent
Kühnel

(10) Patent No.: US 8,834,239 B2
(45) Date of Patent: Sep. 16, 2014

(54) AIR OUTLET IN PARTICULAR FOR A MOTOR VEHICLE

(75) Inventor: Wolfram Kühnel, Stuttgart (DE)

(73) Assignee: Behr GmbH & Co. KG, Stuttgart (DE)

( * ) Notice: Subject to any disclaimer, the term of this patent is extended or adjusted under 35 U.S.C. 154(b) by 733 days.

(21) Appl. No.: 11/579,877

(22) PCT Filed: May 4, 2005

(86) PCT No.: PCT/EP2005/004853
§ 371 (c)(1),
(2), (4) Date: Dec. 18, 2007

(87) PCT Pub. No.: WO2005/110785
PCT Pub. Date: Nov. 24, 2005

(65) Prior Publication Data
US 2008/0233857 A1 Sep. 25, 2008

(30) Foreign Application Priority Data
May 10, 2004 (DE) .......................... 10 2004 023 495

(51) Int. Cl.
*B60H 1/34* (2006.01)
(52) U.S. Cl.
CPC .............. *B60H 1/345* (2013.01); *B60H 1/3457* (2013.01)
USPC ....................................... 454/152
(58) Field of Classification Search
USPC ....................................... 454/152
See application file for complete search history.

(56) References Cited

U.S. PATENT DOCUMENTS

| | | | |
|---|---|---|---|
| 3,503,320 | A | 3/1970 | Geromet |
| 4,437,392 | A | 3/1984 | Stouffer |
| 6,800,023 | B2 | 10/2004 | Demerath |
| 6,805,624 | B2 | 10/2004 | Currle et al. |
| 2006/0135054 | A1* | 6/2006 | Burr et al. ..................... 454/155 |

FOREIGN PATENT DOCUMENTS

| | | |
|---|---|---|
| DE | 1 778 267 | 3/1972 |
| DE | 35 42 389 A1 | 6/1987 |
| DE | 37 11 520 A1 | 4/1988 |
| DE | 88 08 280.6 | 11/1988 |
| DE | 37 36 448 A1 | 5/1989 |
| DE | 197 21 831 A1 | 11/1998 |
| DE | 299 14 962 U1 | 11/1999 |
| DE | 100 36 776 A1 | 2/2002 |
| DE | 102 19 696 A1 | 11/2003 |
| DE | 102 43 974 A1 | 4/2004 |
| DE | 10 2004 011 352 A1 | 9/2004 |
| EP | 0 936 091 A1 | 8/1999 |
| EP | 0 623 202 B1 | 2/2000 |
| EP | 1 099 914 A1 | 5/2001 |

(Continued)

OTHER PUBLICATIONS

EPO English translation of EP 1,332,899.*

*Primary Examiner* — Kang Hu
*Assistant Examiner* — Samantha Miller
(74) *Attorney, Agent, or Firm* — Muncy, Geissler, Olds & Lowe, P.C.

(57) ABSTRACT

An air outlet, in particular for a motor vehicle, includes at least one air guide element in a flow duct for inducing a swirl in the airflow on introduction of air into the air outlet from an air duct and a flow body embodied along the longitudinal axis of the flow duct.

16 Claims, 3 Drawing Sheets

(56) References Cited

FOREIGN PATENT DOCUMENTS

| | | |
|---|---|---|
| EP | 1 223 061 A2 | 7/2002 |
| EP | 1 332 899 A2 | 8/2003 |
| FR | 2 710 880 A1 | 4/1995 |
| JP | 58-214409 | 12/1983 |
| JP | 60-184713 U | 12/1985 |
| JP | 61-152514 | 9/1986 |
| JP | 5-87392 | 4/1993 |
| JP | 05-073449 | 10/1993 |
| JP | 5-294641 | 11/1993 |
| JP | 6-186529 | 7/1994 |
| JP | 10-246500 | 9/1998 |
| JP | 10246500 A * | 9/1998 ............. F24F 13/06 |
| JP | 2004-098905 | 4/2004 |

\* cited by examiner

AIR OUTLET IN PARTICULAR FOR A MOTOR VEHICLE

FIELD OF THE INVENTION

The invention relates to an air diffuser, in particular for a motor vehicle.

BACKGROUND OF THE INVENTION

In motor vehicles, the supply of conditioned air into the passenger compartment is often felt by the passengers to be an unpleasant sensation if this feed takes place in the form of a concentrated jet which strikes the passengers' bodies. This is the case in particular if the space within the passenger compartment is restricted.

To avoid a concentrated jet, it is known to provide a large number of small outlet openings for example in the center console, in the roof or in the B/C pillars. Outlet openings of this type are in widespread use in particular in means of public transport, such as buses, railway carriages or aircraft. However, the provision of a large number of outlet openings is relatively expensive.

EP 1 223 061 A2 has disclosed an air diffuser, in particular for vehicle air-conditioning, having a frame, a plurality of lamellae, which are arranged such that they can pivot about a first axis, and, at least one coupling element, to which each of the lamellae is coupled, the coupling element being adjustable relative to the first axis between a neutral position, in which the lamellae are parallel to one another, and a comfort position, in which at least some of the lamellae can be pivoted in opposite directions to one another. The air diffuser is arranged in front of an air duct from which an air stream emerges; the direction of this air stream can be set with the aid of the air diffuser. The air stream can be made to fan out with the aid of the lamellae which have been pivoted in opposite directions to one another, so as to produce a divergent air stream in which the flow velocities are lower than in an air stream with a constant cross section, so that even with a high throughput of air it is possible to prevent the emerging air stream from coming into contact with a vehicle passenger at a high velocity. However, even an air diffuser of this type still leaves something to be desired.

SUMMARY OF THE INVENTION

It is an object of the invention to provide an improved, in particular less expensive, air diffuser, which as a result of its outflow characteristic provides the maximum possible comfort in the passenger compartment.

According to the invention, an air diffuser, in particular for a motor vehicle, is provided with at least one air-guiding element which is arranged in a flow duct and imparts a swirl to the air stream as it passes from an air duct into the air diffuser, a flow body being formed along the longitudinal center axis of the flow duct. The flow body is preferably of solid configuration with a circular cross section, although for reasons of weight or material saving the flow body may also be of hollow configuration, although the air stream should not be able to flow through it. The air diffuser in this case distributes the air over a very large area, resulting in a complete absence or at least a minimization of drafts.

It is particularly advantageous for an air diffuser of this type to be arranged shortly after a bend, since in this case, if no swirl is imparted to the air stream, a very irregular flow profile is present in the air diffuser, which gives rise to a draft effect which can be virtually or completely eliminated by the application of a swirl. This allows an air diffuser of this type to be more versatile in use, since even if the air diffuser is in an unfavorable position, for example just after a bend, a draft effect can be avoided or at least minimized, thereby considerably enhancing comfort.

To optimize the way in which the air stream is swirled up as it emerges from the air diffuser, the flow body and/or the flow duct in which the flow body is arranged has a cross section which, in the longitudinal direction of the flow duct, changes over the longitudinal direction.

It is preferable for the air-guiding element arranged in the air diffuser to be of helical configuration. In this case, it is also possible for a plurality of helically configured air-guiding elements to be provided at equidistant intervals from one another and in the form of a multi-lead thread.

It is preferable for the pitch of the air-guiding element(s) to be constant, but it is also possible for this pitch to change in particular in the air inlet region of the air diffuser or in the outlet region thereof. For example, the pitch may in particular be greater in the inlet region than in the outlet region. In a further advantageous configuration of an air diffuser, the latter has an air-guiding element pitch which increases or decreases in the direction of flow. The swirl imparted to the flow can be influenced by the change in cross section in the flow path and the resulting acceleration or deceleration of the flow.

To increase passenger comfort, the air diffuser preferably has a direction-setting device, so that the mean direction of flow of the air stream which emerges in diffuse form from the air diffuser can be set.

It is preferable for the air diffuser with direction-setting device to have an outer flow duct, in which case the direction-setting device is arranged in the outer flow duct. In this case, it is preferable for the flow body to be formed in the direction-setting device along the longitudinal center axis of the inner flow duct. The air-guiding element for generating swirl is preferably arranged helically around the flow body.

The outer flow duct preferably has a cross section which widens as seen in the direction of air flow, thereby boosting the diffusion of the air stream.

It is preferable for all the pivot axes of the direction-setting device to be arranged centrally with respect to the longitudinal extent of the inner flow duct. However, in particular in the case of relatively large adjustment angles, it may be expedient for this point to be offset toward the direction of the air stream.

BRIEF DESCRIPTION OF THE DRAWINGS

In the text which follows, the invention is explained in detail on the basis of three exemplary embodiments with variants, in part with reference to the drawing, in which.

DETAILED DESCRIPTION

Figure 2:
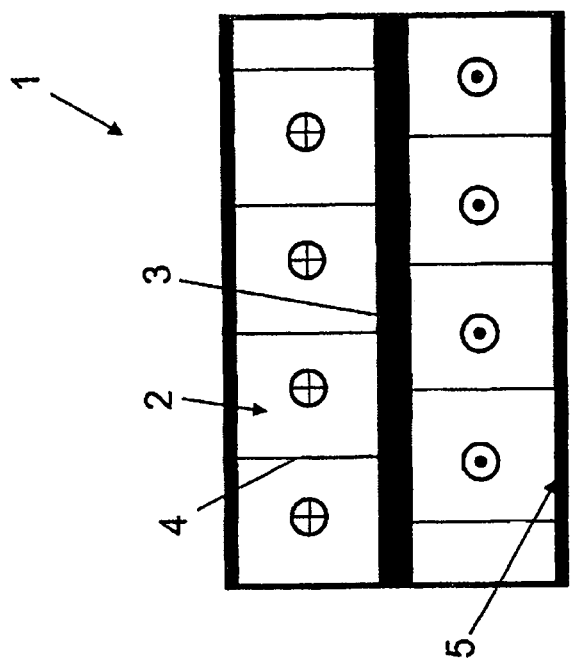
FIG. 2 shows a section on line II-II in FIG. 1, FIG. 3 diagrammatically depicts the cross section of an air diffuser in accordance with the second exemplary embodiment.
Figure 1:
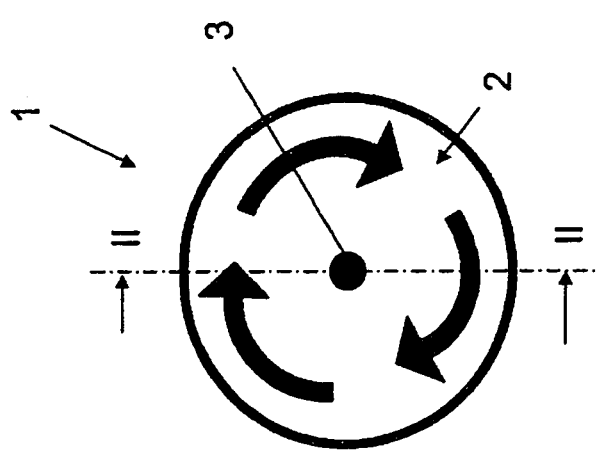
FIG. 1 diagrammatically depicts the cross section of an air diffuser in accordance with the first exemplary embodiment.

An air diffuser 1 by means of which conditioned air coming from an air-conditioning system can be fed with a swirl to a passenger compartment has, in its swirl zone, a flow duct 2 with a circular cross section which, in its longitudinal center axis, has a flow body 3 with a guiding element 4. The flow body 3, which is solid in form, has a circular cross section, and the guiding element 4 extends helically in the radial direction with a constant pitch between flow body 3 and inner lateral surface 5 of the flow duct 2.

The air which is fed to the air diffuser 1 via an air duct (not shown) has a type of screw motion imparted to it by the guiding element 4, so that the air stream enters the passenger compartment with a swirl and therefore in diffuse form. On account of the absence of a spot jet, the diffuse air stream is not considered an unpleasant sensation even if it comes into contact with a passenger.

According to a variant of the first exemplary embodiment which is not illustrated in the drawing, the air diffuser has two guiding elements, which are each formed in the same way as the air-guiding element 4 of the first exemplary embodiment but are arranged offset through 180° with respect to one another.

Figure 4:
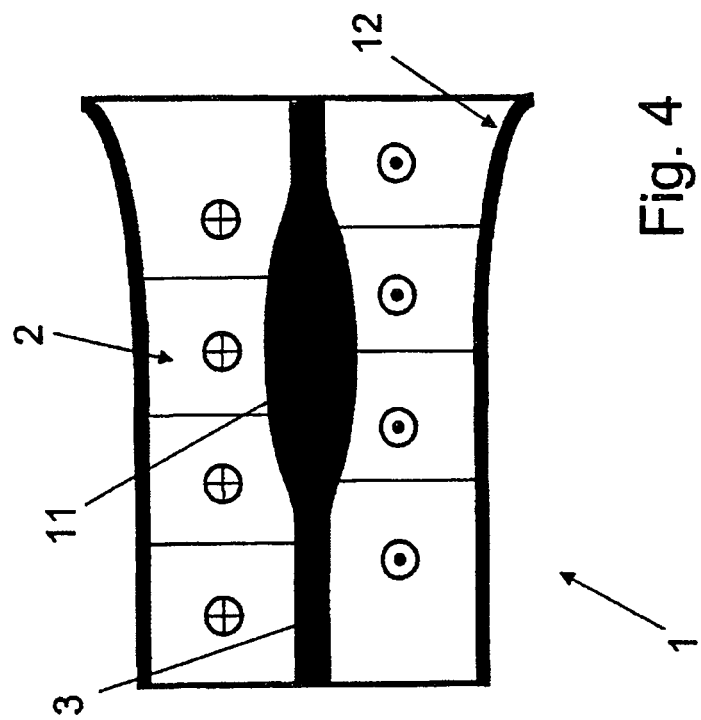
FIG. 4 shows a section on line IV-IV in FIG. 3, FIG. 5 diagrammatically depicts the cross section of an air diffuser in accordance with the third exemplary embodiment.
Figure 3:
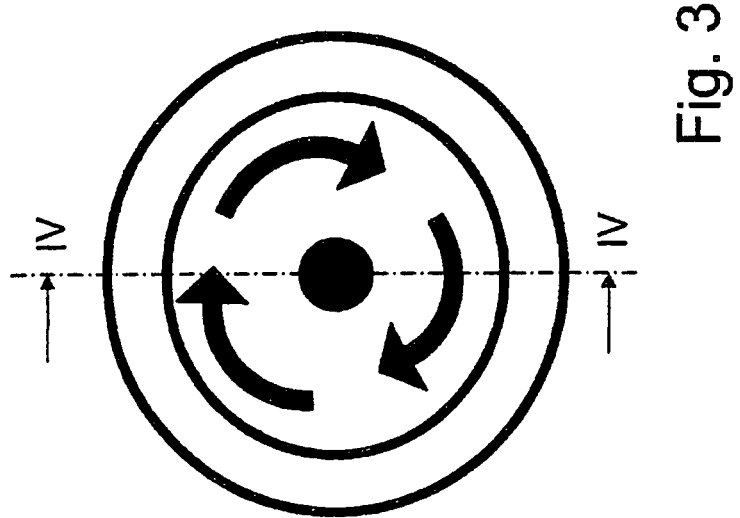
Figure 6:
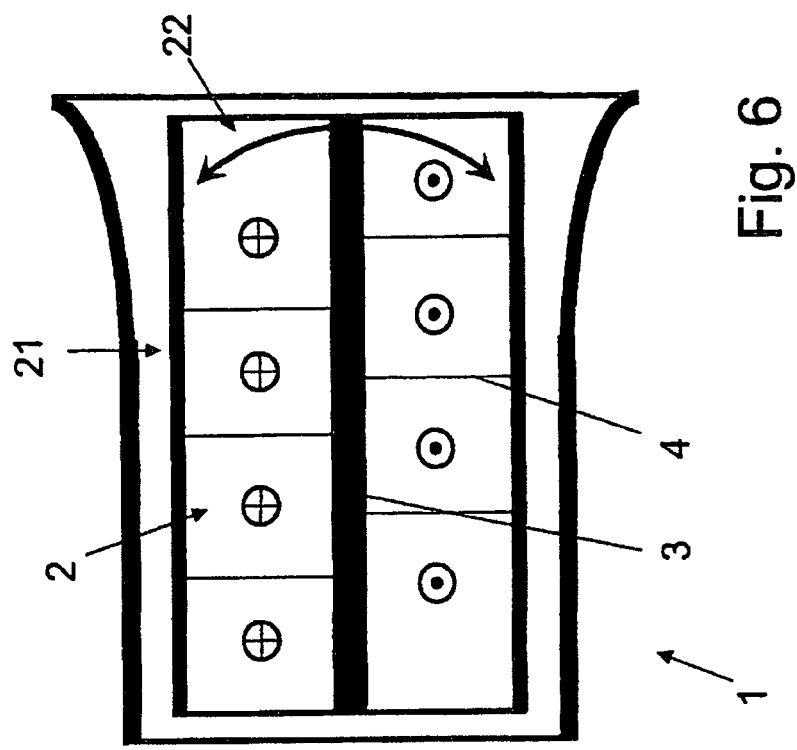
FIG. 6 shows a section on line VI-VI in FIG. 5.
Figure 5:
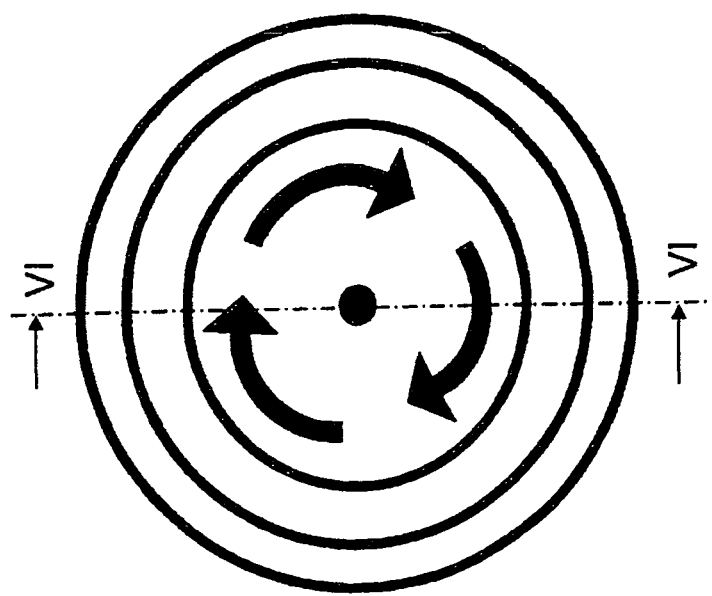

FIGS. 3 and 4 show the second exemplary embodiment, according to which what is provided is an air diffuser 1 with a flow body 3 and flow duct 2 whose shape deviates from the corresponding components in the first exemplary embodiment. The solid flow body 3 and the flow duct 2 have a contour which deviates from the cylindrical shape and influences the outlet characteristic of the air stream so as to optimize the way in which the swirl is imparted. In the present case, the flow body 3 has a streamlined thickened portion 11 in a region before the outlet region, and the flow duct 2 has a widened portion 12 in the outlet region.

According to a variant of the second exemplary embodiment which is not shown in the drawing, the flow body in the outlet region has a thickened portion which approximately corresponds to the increase in the diameter of the flow duct in the outlet region, following a profile corresponding to that of the second exemplary embodiment. The widening in the cross section of flow with a slight diversion outward (and inward on leaving the flow duct) in the outlet region of the air diffuser in this case makes a contribution to swirling of the air stream and therefore to optimizing the diffusion of the air stream as it emerges.

The air diffuser 1 in accordance with the third exemplary embodiment is in two-part form. The air diffuser 1 has an outer flow duct 21 which widens toward its end lying in the direction of air flow and also has a direction-setting device 22. The shape of the direction-setting device 22 substantially corresponds to that of the air diffuser 1, i.e. it has an inner flow duct 2 with a circular cross section, a flow body 3 running in the longitudinal center axis of the flow duct 2 and a guiding element 4, this inner flow duct 2 together with flow body 3 and guiding element 4 being mounted such that it can pivot over a small angle in any desired direction within the outer flow duct 21, so that the main outlet direction of the air stream which emerges in diffuse form can be set within a certain angular range. The direction-setting device 22 according to the third exemplary embodiment is configured in such a manner that the inner flow duct 3 is mounted in its center, so that in the event of any desired pivoting movement the associated pivot axis runs through this center point.

An air diffuser according to the exemplary embodiments described above is suitable in particular for conditions in which space is limited and in which it is necessary to feed air into the passenger compartment without the risk of a draft when the air comes into direct contact with a passenger. Suitable applications are in particular air diffusers in the B/C pillars, although an air diffuser of this type may also be used at any other desired positions in a vehicle, aircraft, ship or any desired air-conditioned space.

To control the air stream, it is possible for a flap to be arranged in front of the air diffuser; this flap can be actuated by means of an operating device arranged in the passenger compartment. In its simplest possible form, the flap may simply have an open and shut position, whereas in its most complicated form it can provide continuously variable adjustment of the air stream.

LIST OF REFERENCE DESIGNATIONS

1 Air diffuser
2 Flow duct
3 Flow body
4 Guiding element
5 Inner lateral surface
11 Thickened portion
12 Widened portion
21 Outer flow duct
22 Direction-setting device

The invention claimed is:

1. An air diffuser comprising a flow duct having a longitudinal center axis and at least one air-guiding element arranged in the flow duct, the at least one air-guiding element being configured to impart a swirl to the air stream as the air stream passes through the air diffuser, the at least one air-guiding element comprising a flow body formed on the longitudinal center axis of the flow duct and a web projecting from the flow body, wherein the flow body has a cross section perpendicular to a longitudinal axis of the flow body which changes along the longitudinal axis of the flow body.

2. The air diffuser as claimed in claim 1, wherein the portion of the flow duct in which the air-guiding element is arranged has a cross section which changes over the longitudinal direction.

3. The air diffuser as claimed in claim 1, wherein the web is helical.

4. The air diffuser as claimed in claim 3, wherein the helical web has a constant pitch.

5. The air diffuser as claimed in claim 3, wherein the helical web has a decreasing or increasing pitch.

6. The air diffuser as claimed in claim 1, wherein the air diffuser has a direction-setting device.

7. The air diffuser as claimed in claim 6, wherein the air diffuser with direction-setting device has an outer flow duct, the direction-setting device is arranged in the outer flow duct, and the flow body is formed in the direction-setting device along the longitudinal center axis of the inner flow duct.

8. The air diffuser as claimed in claim 6, wherein the cross section of the outer flow duct widens as seen in the direction of air flow.

9. The air diffuser as claimed in claim 6, wherein all the pivot axes of the direction-setting device are arranged centrally with respect to the longitudinal extent of the inner flow duct.

10. The air diffuser as claimed in claim 1, wherein the web encircles at least a portion of said flow body.

11. The air diffuser of claim 1 wherein the flow body has a solid cross section in a direction normal to the longitudinal axis of said flow duct.

12. An air diffuser for a motor vehicle, the air diffuser comprising:
an outer flow duct having an outer wall and an inner wall;
an inner flow duct having an outer wall and an inner wall mounted inside the outer flow duct with the outer wall of the inner flow duct spaced from and facing the inner wall of the outer flow duct, the inner wall of the inner flow duct defining an interior of the inner flow duct, the inner flow duct having a longitudinal axis and being configured to be connectable to an air duct;

at least one air-guiding element in the inner flow duct configured to impart a swirl to an air stream passing through the inner flow duct, the at least one air-guiding element comprising an elongate flow body extending along the longitudinal axis of the inner flow duct and a web projecting from the elongate flow body and extending to the inner wall of the inner flow duct, wherein the elongate flow body has a solid cross section in a direction normal to the longitudinal axis of said flow duct, wherein the outer flow duct surrounds the at least one air-guiding element, and wherein the inner flow duct is pivotably mounted inside the outer flow duct for pivotable movement about an axis perpendicular to the longitudinal axis of the outer flow duct.

13. The air diffuser as claimed in claim 12, wherein the flow body cross section is circular.

14. The air diffuser as claimed in claim 12, wherein the cross section of the flow body changes in the direction of the longitudinal axis of the inner flow duct.

15. The air diffuser as claimed in claim 12, wherein the web is helical.

16. The air diffuser as claimed in claim 12, wherein the web encircles at least a portion of said flow body.

* * * * *